United States Patent [19]
Norton et al.

[11] Patent Number: 5,803,810
[45] Date of Patent: Sep. 8, 1998

[54] VELOCITY-BASED COMMAND RECOGNITION TECHNOLOGY

[75] Inventors: John Mark Norton, Santa Clarita; Bela Laszlo Brozsek, Topanga, both of Calif.

[73] Assignee: Perception Systems, Inc., Santa Clarita, Calif.

[21] Appl. No.: 554,473

[22] Filed: Nov. 7, 1995

[30] Foreign Application Priority Data

Mar. 23, 1995 [GB] United Kingdom ............ 9505916

[51] Int. Cl.⁶ .................... A03F 9/22; G01V 9/04
[52] U.S. Cl. ............... 463/36; 250/221; 345/156
[58] Field of Search ................ 463/36, 29, 47; 345/156, 158; 250/202, 221

[56] References Cited

U.S. PATENT DOCUMENTS

| | | | |
|---|---|---|---|
| Re. 33,662 | 8/1991 | Blair et al. ................ | 463/3 |
| 4,711,543 | 12/1987 | Blair et al. ................ | 352/87 |
| 4,768,088 | 8/1988 | Ando ....................... | 348/77 |
| 4,925,189 | 5/1990 | Braeunig .................. | 273/148 B |
| 5,227,985 | 7/1993 | DeMenthon ............... | 364/559 |
| 5,239,463 | 8/1993 | Blair et al. ................ | 364/410 |
| 5,241,608 | 8/1993 | Fogel ....................... | 364/174 |
| 5,320,538 | 6/1994 | Baum ....................... | 434/307 R |
| 5,347,306 | 9/1994 | Nitta ........................ | 348/15 |
| 5,423,554 | 6/1995 | Davis ....................... | 463/4 |
| 5,442,168 | 8/1995 | Gurner et al. ............. | 364/410 |

FOREIGN PATENT DOCUMENTS

477910A2  9/1991  European Pat. Off. .

OTHER PUBLICATIONS

IBM Corporation Technical Disclosure Bulletin (re Virtual Mouse) vol. 34 No. 12, May 1992.

Article: PC–SteuerungIMHANDDUMDR Funkschau 66 (1994), 21 Jan., No. 3, pp. 82–85.

*Primary Examiner*—Jessica Harrison
*Assistant Examiner*—James Schaaf
*Attorney, Agent, or Firm*—Oppenheimer Poms Smith

[57] ABSTRACT

A controller provides control signals to a computer based upon the movement of a user. The controller has an optical detector for detecting and monitoring the movement of a user, particularly movement of selected body parts, and circuitry for outputting a control signal to the computer in accordance with detected movement. A vector indicative of detected movement is generated on a frame-to-frame basis using only a few representative edge pixels of the body parts. Control signals for the direction and the velocity of the movement are determined from the vector and move a graphical user interface on a display accordingly.

3 Claims, 4 Drawing Sheets

VELOCITY-BASED COMMAND RECOGNITION TECHNOLOGY

Several different input devices for controlling a computer are known. Traditional devices have included a keyboard, a "mouse", etc. For computer gams, joysticks and game pads are other well known input devices. Many variants of the basic joystick and game pad are known. All of these devices require mechanical movement of some aspect of the device in order to output control signals to the computer.

The mechanical prior art devices have a number of drawbacks. The amount of control possible with a conventional device is often fairly limited. For example, a joystick can usually only provide directional control in eight distinct directions; controlling the speed of movement of a character in a game often requires the use of a combination of buttons as well as use of the joystick for directional control, which means that the user has to spend a considerable period of time just learning to use the controls for a new game. It is often easy for dirt to enter the device as well as impair the integrity of the electrical connections. The required movement for some of the prior art controllers can be counterintuitive, particularly for games applications. Furthermore, and probably most significantly, repeated and prolonged use of a mouse, joystick, or game pad, for example, can cause paid to the user, particularly in the hand or arm, and may cause long term or permanent damage to the user.

According to a first aspect of the present invention, there is provided a controller for providing control signals to a computer, the controller comprising:

an optical detector for optically detecting movement of a user; and, means for outputting a control signal to a computer in accordance with the detected movement.

The optical detector may comprise a light receiver for receiving light from a user on a frame-by-frame basis and an analyzer for analyzing specified frames to detect movement of a user occurring between said specified frames. The analyzer may comprise means for detecting a change between frames in the incident light from a particular region of the field of view of the optical detector.

The optical detector may include a CCD (charge-coupled device).

According to a second aspect of the present invention, there is provided a method of providing control signals to a computer, the method comprising the steps of:

optically detecting movement of a user; and, outputting a control signal to a computer in accordance with the detected movement.

The light may be received from a user on a frame-by-frame basis and specified frames analyzed to detect movement of a user occurring between said specified frames. A change between frames in the incident light from a particular region of the field of view of the optical detector may be detected.

The present invention also includes a computer having a display screen and a controller as described above, wherein the control signal is arranged to control movement of a cursor or sprite displayed on the display screen.

The user can control a computer by using hand signals for example. In particular, in a game for example, a sprite or character displayed in the game can be made to move to the left by the user moving his or her left arm up and down. Similarly, a cursor in a graphical user interface (GUI) such as Windows (TM) can be moved to the left or the right by appropriate movement of the user's left or right hand.

An example of the present invention will now be described with reference to the accompanying drawings, in which.

Figure 1:
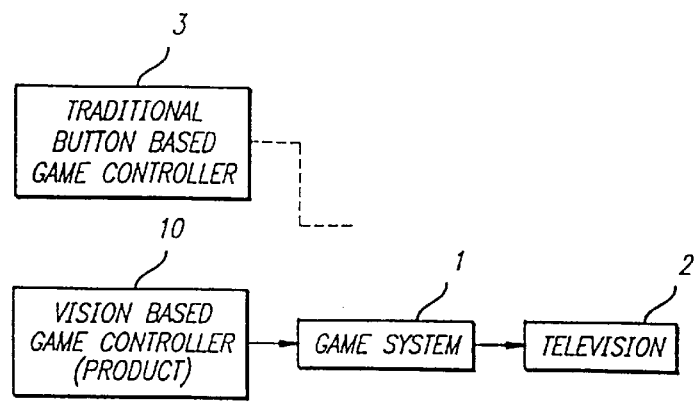
FIG. 1 is a block diagram showing connection of a controller to a computer games system and television.
Figure 2:
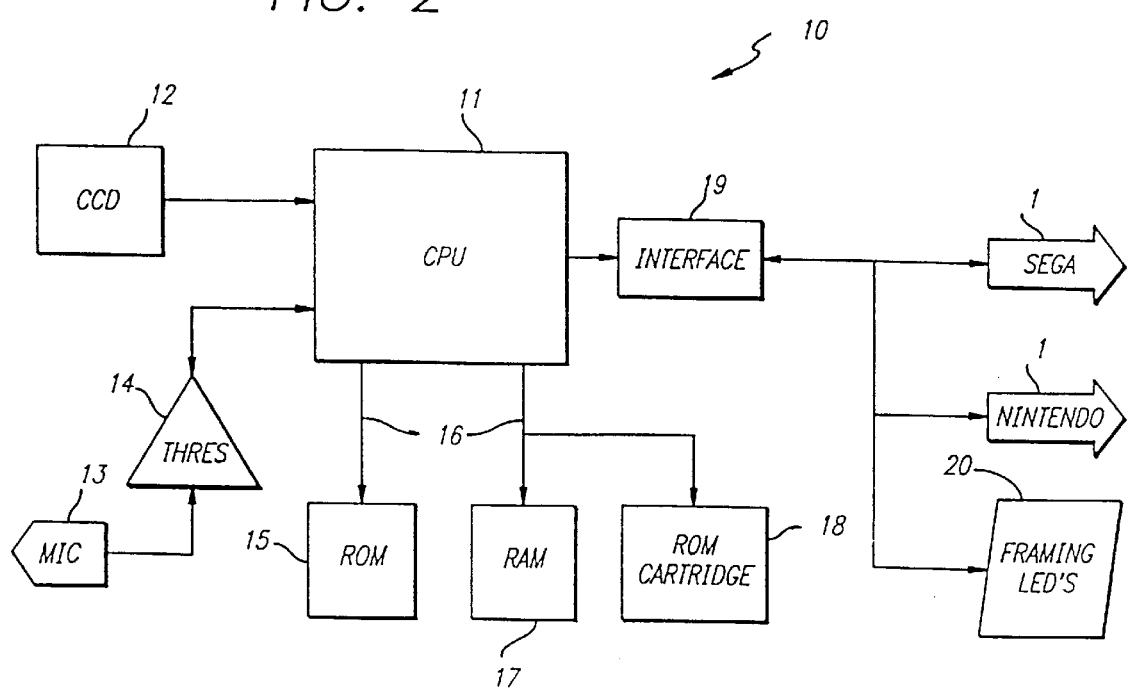
FIG. 2 is a block diagram of the components of a controller.

In FIG. 1 there is shown a game system 1 as an example of a computer. The game system 1 is connected to a television or monitor 2. Traditionally, a button-based game controller 3 such as a joystick has been connected to the games system 1. The button-based game controller 3 is replaced by a controller 10 in accordance with the present invention.

The controller 10 has a central processor unit (CPU) 11. The CPU 11 is preferably a CMOS so as to minimize the power requirements for the controller 10. The CPU 11 may have a 16 bit internal architecture with an 8 bit external connection.

A charge-coupled device (CCD) 12 is able to receive light from the environment of the controller 10 and provide signals to the CPU 11 in a known manner. The CCD 12 may have an on-chip analog-to-digital converter which has a parallel data output to allow direct connection to the CPU 11. The CPU 11 asserts the address of the pixel for which information is required and the CCD 12 accordingly supplies the 8 bit gray level value for that pixel to the CPU 11. Instead of having an on-chip analog-to-digital converter, a stand alone CCD could be used with an external analog-to-digital converter. The external circuitry can be synchronized with the addressing cycle of the CPU 11 for sequential access of the required information.

Another input device to the controller 10 is a microphone 13. The microphone 13 may be connected to the CPU 11 by a bandpass circuit and threshold circuit 14. The bandpass circuit filters the signal input from the microphones 13 in order to discriminate a spoken phrase from other sources of background noise. A digital signal is output to the CPU 11 from the bandpass circuit and threshold circuit 14 to indicate the presence of the user's phrase. A control loop is preferably set up within the CPU so that the threshold level of the bandpass circuit and threshold circuit 14 can be adjusted by the CPU 11. This therefore provides a variable threshold level which can be adjusted automatically by the CPU 11 depending on the software application running on the computer or game system 1 or according to the level of background noise in the user's environment, for example.

A read only memory (ROM) 15 is connected to the CPU 11 by address and data buses 16. The ROM 15 stores the executable image of the software used by the controller 10. Similarly, a random access memory (RAM) 17 is also connected to the CPU via a further address and data bus 16. The RAM 17 is used primarily for storage of a reference image which is used by the CPU 11 to detect motion, as will be described further below. As will be understood, the CPU 11 may have sufficient memory capacity to eliminate the need for an external ROM 15 and/or RAM 17.

There is a facility for a further plug-in ROM cartridge 18. The use of an additional ROM cartridge 18, connected to the CPU 11 via a card slot, allows the user to install further software, for example for specialized or particular software applications under control of the controller 10 or to receive software updates for the software in the controller 10. The ROM cartridge 18 consists of a ROM mounted on a printed circuit board for connection to the CPU 11.

The CPU 11 is connected to an interface 19. The interface 19 accepts the output control signals from the CPU 11 and matches the level of those signals to the game system or other computer 1 being controlled. The interface 19 also buffers the power taken from the game system or computer 1 being controlled in order to provide an appropriate power supply to the controller 10. The use of CMOS electronic components in the controller 10 where possible enables the controller 10 to function with the minimum of power taken from the game system or computer 1.

As well as the level setting and buffering circuits on the interface 19, the interface 19 may also provide the physical connection to the game system or computer 1 to be controlled. This connection may consist of a standard joystick connection or similar, or may be a DIN or coaxial connection, for example. A variety of different connectors may be provided with the controller 10 so that the user can use the appropriate connector for the game system or computer 1 being controlled. The interface 19 may be configured to provide a RS232 type signal which is typical of many computer/mouse connections. These connections, as well as the level matching and buffering aspects of the interface 19, will be well understood by a person skilled in the art.

Figure 3A:
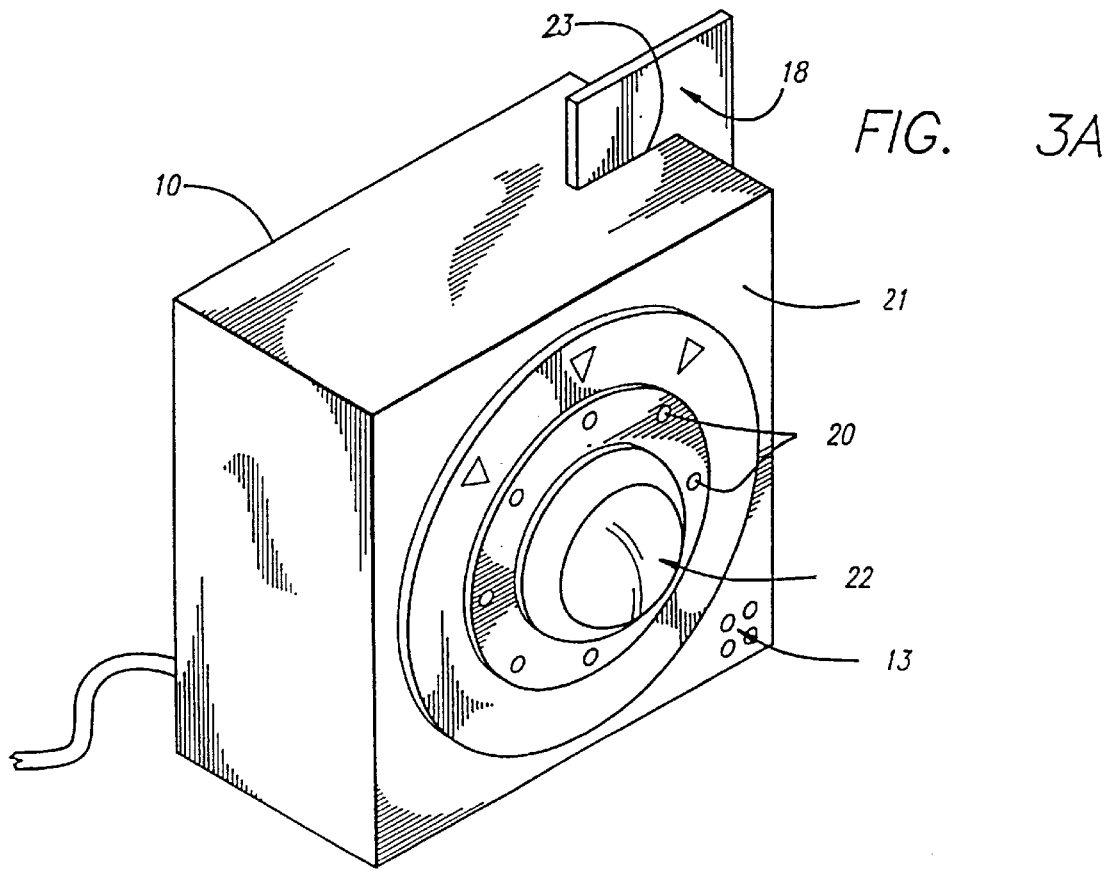
FIG. 3A is a perspective view of the controller.
Figure 3B:
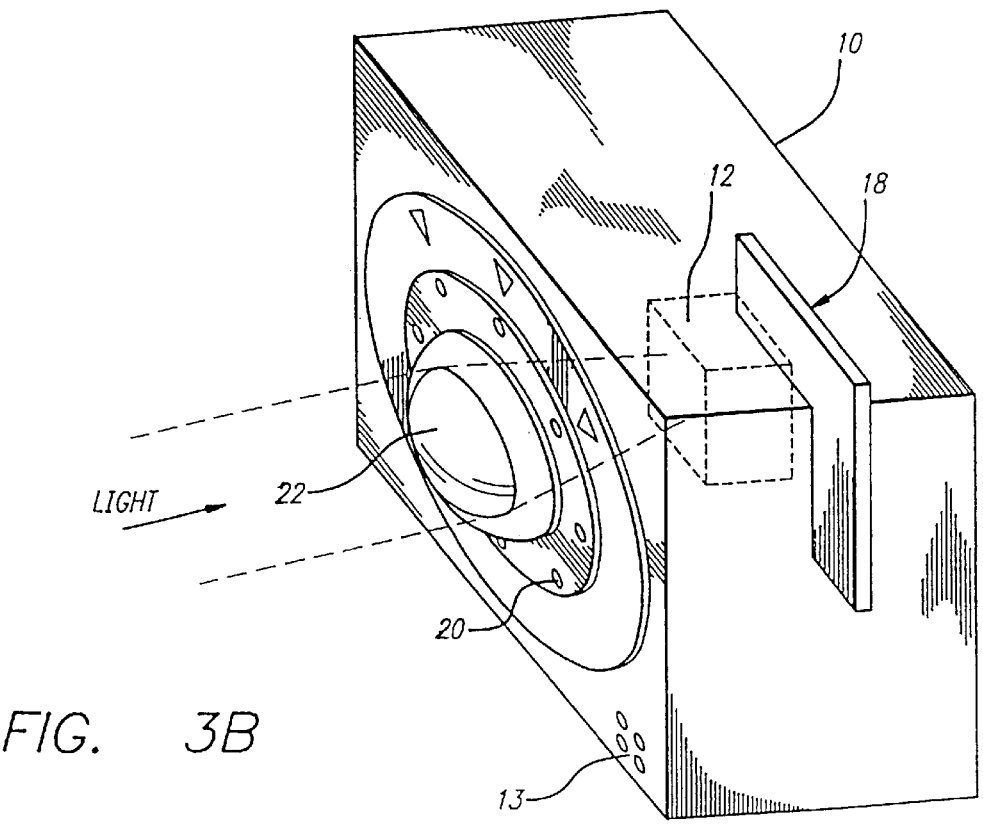
FIG. 3B is another perspective view of the controller.

As shown in FIGS. 3A and 3B, the controller 10 may have a ring of light emitting diodes (LEDs) 20 on its front face 21. The interface 19 provides signals of an appropriate level to drive the LEDs 20, as will be described in more detail below. The lens 22 for the CCD 12 is mounted centrally of the ring of LEDs 20. Alternatively, the lens 22 may be mounted generally in the ring formed by the LEDs 20. A slot 23 for the plug-in ROM cartridge 18 is also provided.

Figure 4:
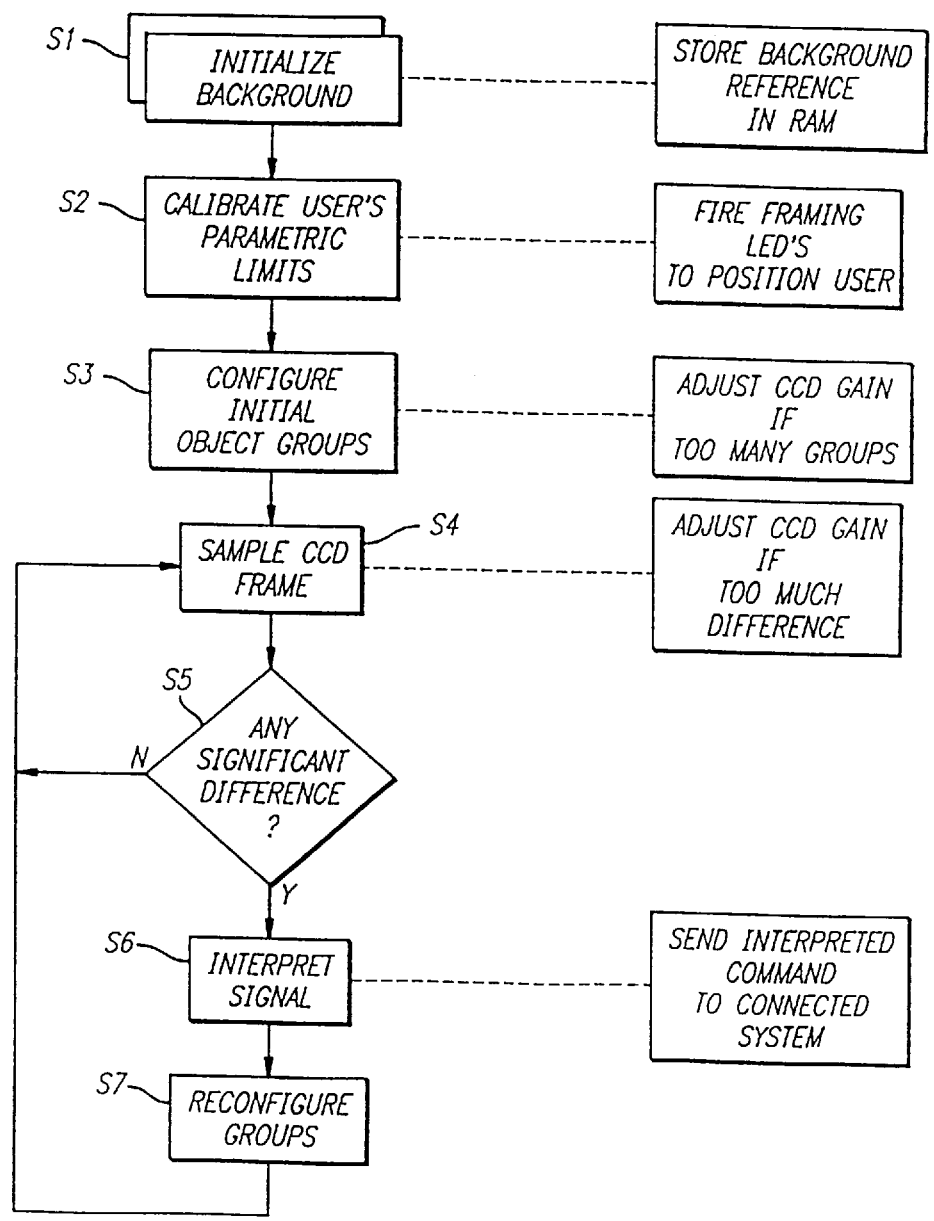
FIG. 4 is a flow diagram illustrating operation of the controller.

The operation of the controller 10 will now be described with particular reference to FIGS. 4 and 5. On start-up, or on demand from the user, the software running in the controller 10 enters an initialization mode. In step S1 in FIG. 4, the user's background is captured and stored as a reference in the RAM 17. In the subsequent step S2, the user's parametric limits are calibrated. During this step, the user may move through the range of motions that will be desired in using the software, for example to play a game. This step S2 allows the user to determine the extent of movement required to initiate a command from the controller 10. For example, the system can be set so that relatively large body or hand movements are required or, alternatively, so that only relatively small body or hand movements are required. The user can decide whether to be seated or standing.

Figure 5:
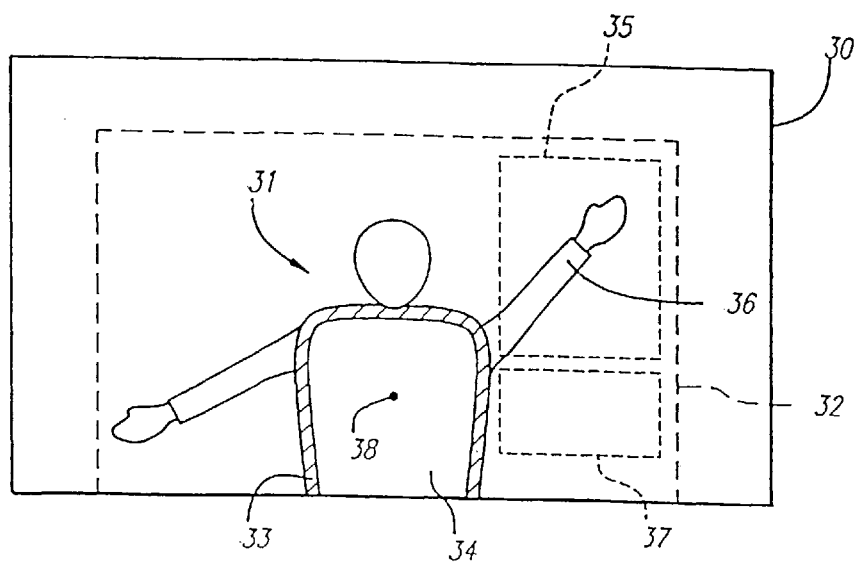
FIG. 5 is a schematic drawing showing the controller's field of view.

With reference to FIG. 5, the field of view 30 of the CCD 12 is indicated. A user 31 is shown generally centrally of the field of view 30. The envelope of the user's motion is indicated by a dashed line 32. It will be seen that the envelope 32 of the user's motion is spaced from the sides and top of the field of view 30 of the CCD 12 in order to allow for some movement of the user 31 from the center of the field of view 30. In addition, a buffer zone 33 is determined around the torso 34 of the user 31. This buffer zone 33 is not used for decoding the desired commands from the user 31 and thus allows some minor movement of the user to the left, right, up or down without those minor movements being interpreted as desired commands.

As mentioned, during the step S2, the basic position and movements of the user 31 are calibrated. In particular, various command regions are determined. If the user moves into a command region, or moves a hand up and down in a command region for example, the software will analyze that movement to determine the desired output signal. One example of a command region is indicated by a dotted box 35 around the user's left arm 36 in FIG. 5 so that movement of the user's left arm 36, in the command region 35 for that arm 36, will be detected by the software. In general, the command regions can be specified anywhere in the field of view 30 outside the buffer zone 33 around the user's torso 34.

If it is determined in the step S2 that the envelope of user's motion 32 has moved outside the field of view 30 of the CCD 12, the CPU 11 causes appropriate signals to be output to the framing LEDs 20 on the controller 10. For example, if the user 31 has moved too far to the left, the LEDs 20 to the right of the user may be caused to flash to indicate that the user should move to the right. Similarly, the LEDs 20 to the top, bottom or left can be flashed to prompt the user to move in the appropriate direction. If the user is too close to or too far away from the CCD 12, an appropriate combination of flashing LEDs 20 can be used to indicate that the user should move further away from or nearer to the CCD 12 as necessary.

In the step S3, the precise object groups or command regions for the user motion are configured and stored. One example of a command region 35 around the user's left arm 36 has already been discussed. Any reasonable motion of the user's arms in any particular region within the field of view 30 can be set along with the associated output command from the controller 10. For example, movement of the user's left arm 36 in the command region 35 may cause a character in a game to move to the left. A "special" move for a particular game, such as causing a character to spin about its own axis, can be controlled by defining a further command region 37 for the user's left arm 36 below the first command region 35 for example, as indicated by a dot and dashed line 37. Movement of the user's left arm 36 into the second command region 37 will produce the necessary output from the controller 10 to cause the character to execute the "special" move. As another example, the user could hold both arms out horizontally to the sides to indicate that a "flying" motion is required or the character.

In the step S3, if too many command regions or object groups have been defined, the gain of the CCD 12 can be adjusted so as to enhance or reduce the contrast between the user and the environment. In other words, the sensitivity of the system can be adjusted. Also, the gain of the CCD 12 can be initially set according to the background lighting in order to provide the maximum contrast between the user 31 and the user's background for the software.

Once the initializing steps S1 to S3 have been completed, the software proceeds to step S4 for dynamic control of the outputs from the controller 10. In particular, in the step S4, the field of view 30 of the CCD 12 is sampled and compared with the previously sampled frame. If there is too much difference between the two frames, for example because the background lighting has changed dramatically, the gain of the CCD 12 can be adjusted as indicated in FIG. 4.

In the step S5, it is determined whether or not there are any differences between the first sampled frame and the second sampled frame by comparing corresponding pixels in a command region. If there are no significant differences, control returns to the step S4. If there are significant differences, control proceeds to the step S6.

In the step S6, the motion of the user in a particular command region or object group is interpreted in order to cause the CPU 11 to output an appropriate command signal to the game signal or computer 1 to which the controller 10 is connected.

Control then proceeds to the step S7 in which the command regions or object groups are reconfigured so that wholesale movement of the user 31 can be accommodated. In particular, the position of the centroid 38 of the user's torso 34 is determined. If the user 31 moves up as determined by movement of the centroid 38, the position of each of the defined command regions or object groups (for example the command regions 35, 37 in FIG. 5) can similarly be indexed upwards to accommodate such movement of the user. Control then returns to the step S4 for sampling of the next frame.

In the step S6, as the time interval between the sampled frames will be known, and correspondingly the amount of possible movement by a user in that time can be determined, suspiciously large movements (for example caused by other persons appearing in the background) can be ignored or an interpolated value used instead. Also, if at any time the envelope of user's motion 32 moves outside the field of view 30 of the CCD 12, the game or other software running on the game system or computer 1 can be caused to pause so that the user can be prompted by the use of the LEDs 20 to move centrally of the field of view 30 again.

It will be appreciated that many different movements of the user 31 can be stored during the initialization steps. Movement of the hands and arms could be separately stored. In addition, if the user 31 crouches down, this can correspondingly cause a character on screen to crouch down. Accordingly, more intuitive movements can be used by the user to control the game system or computer 1 without necessarily requiring the user to remember a series of special (and often complex) key combinations in order to produce the desired effect in the software running on the game system or computer 1.

The controller 10 can be used to obtain proportional control of a game. For example, the system can be set so that the faster the user moves an arm, the faster the character will move in the appropriate direction. As another example, the direction of movement can be proportionally controlled and movement is not restricted to the usual north, south, east, west, north-east, south-east, south-west, and north-west directions commonly found in many games.

The ROM cartridge 18 may contain game or other application-specific information so that it can compare received audio and/or visual information from the microphone 13, lens 22 and CCD 12 with the stored information to determine what control commands should be sent to the computer being controlled by the controller 10.

The decision making processes in the computer 10 can be reasonably sophisticated. For example, motion prediction may be used by analyzing the speed and direction of movement of a user, or elements of a user and knowing the interrelation between the elements. The software could be such as to allow the controller 10 to "understand" what human motion is possible or desirable so that the controller might be used in connection with training a person to use a computer, for exercise, rehabilitation, or therapy, for example.

We claim:

1. A method of providing control signals to a computer the method comprising the steps of:

optically detecting movement of a user;

outputting a control signal to a computer in accordance with the detected movement; and determining the position of a user's torso and using said determination to generate a buffer region in which user movement is not detected.

2. A method of providing control signals to a computer, the method comprising the steps of:

receiving light from a user with an optical detector on a frame-by-frame basis, the optical detector having a field of view;

specifying frames to be analyzed to detect movement of the user occurring between said specified frames;

outputting a control signal to a computer in accordance with detected movement of the user; and determining the position of the user's torso and using said determination to generate a buffer region in which user movement is not detected.

3. A method of providing control signals to a computer, the method comprising the steps of:

receiving light from a user with an optical detector on a frame-by-frame basis, the optical detector having a field of view;

specifying frames to be analyzed to detect movement of the user occurring between said specified frames;

detecting a change between said specified frames in the received light from a particular region of the field of view of the optical detector, the change representing detected movement;

outputting a control signal to a computer in accordance with the detected movement; and determining the position of the user's torso and using said determination to generate a buffer region in which user movement is not detected.

* * * * *